United States Patent [19]

Muller et al.

[11] 4,187,437
[45] Feb. 5, 1980

[54] SWITCHING APPARATUS FOR MEDIUM-VOLTAGE CABLE NETWORKS

[75] Inventors: Bruno Müller, Berlin; Werner Kohler, Bentfeld, both of Fed. Rep. of Germany

[73] Assignee: Siemens Aktiengesellschaft, Berlin and Munich, Fed. Rep. of Germany

[21] Appl. No.: 820,293

[22] Filed: Jul. 29, 1977

[30] Foreign Application Priority Data

Aug. 11, 1976 [DE] Fed. Rep. of Germany ....... 2636410

[51] Int. Cl.² .......................... H02G 9/02; H02B 1/20
[52] U.S. Cl. .................................... 307/147; 361/334; 174/37
[58] Field of Search ............... 307/147, 112, 134, 139, 307/95; 361/142, 331–335, 342, 351, 355–357; 200/302, 293, 304; 174/37, 52 PE

[56] References Cited

U.S. PATENT DOCUMENTS

| | | | |
|---|---|---|---|
| 2,785,319 | 3/1957 | Simpson | 307/147 |
| 3,471,669 | 10/1969 | Curtis | 200/302 |
| 3,522,404 | 8/1970 | Trayer | 200/302 |

FOREIGN PATENT DOCUMENTS 598621 6/1934 Fed. Rep. of Germany ........... 361/332

*Primary Examiner*—John Gonzales
*Assistant Examiner*—S. D. Schreyer
*Attorney, Agent, or Firm*—Kenyon & Kenyon

[57] ABSTRACT

A switching apparatus adapted to be used with medium-voltage cable networks comprising switching units each of which is of the single-pole type and each of which includes an encapsulation adapted to be embedded directly in the soil and means for actuating the unit in response to a remote control.

The switching apparatus is particularly suited for medium-voltage cable networks in cities where the erection of above-ground distribution facilities is undesirable and expensive. The switching units may, preferably, be designed as vacuum circuit breakers.

5 Claims, 6 Drawing Figures

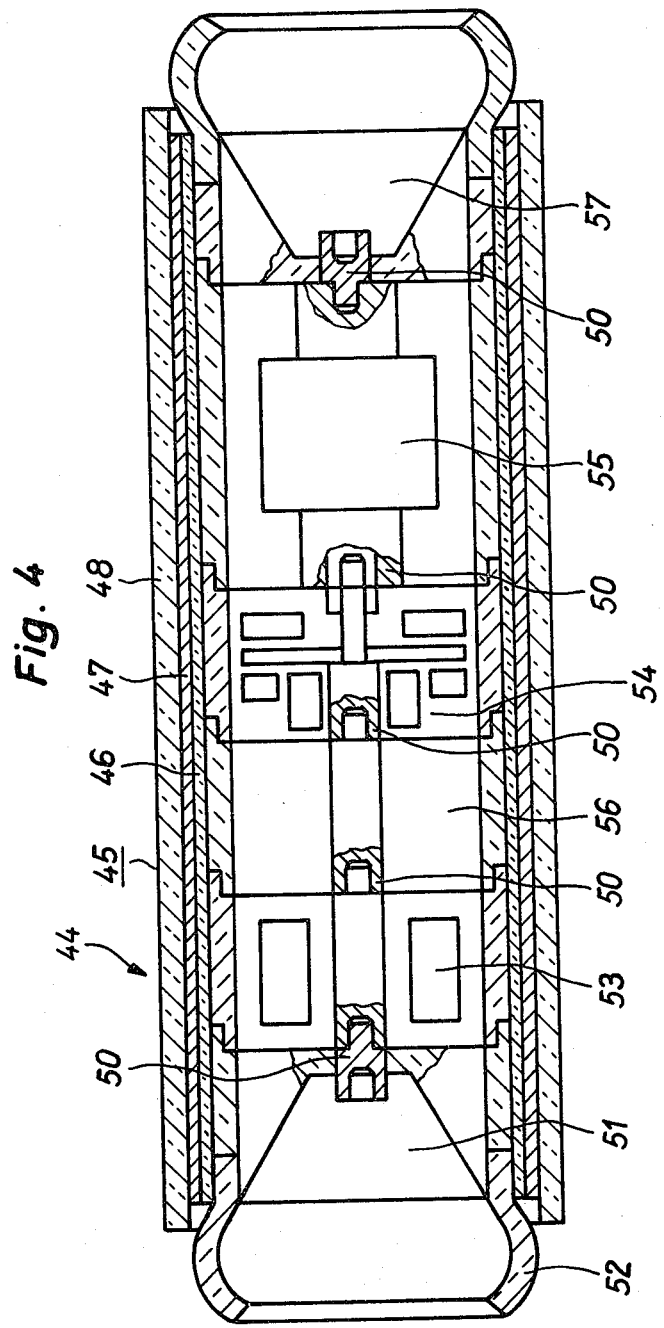

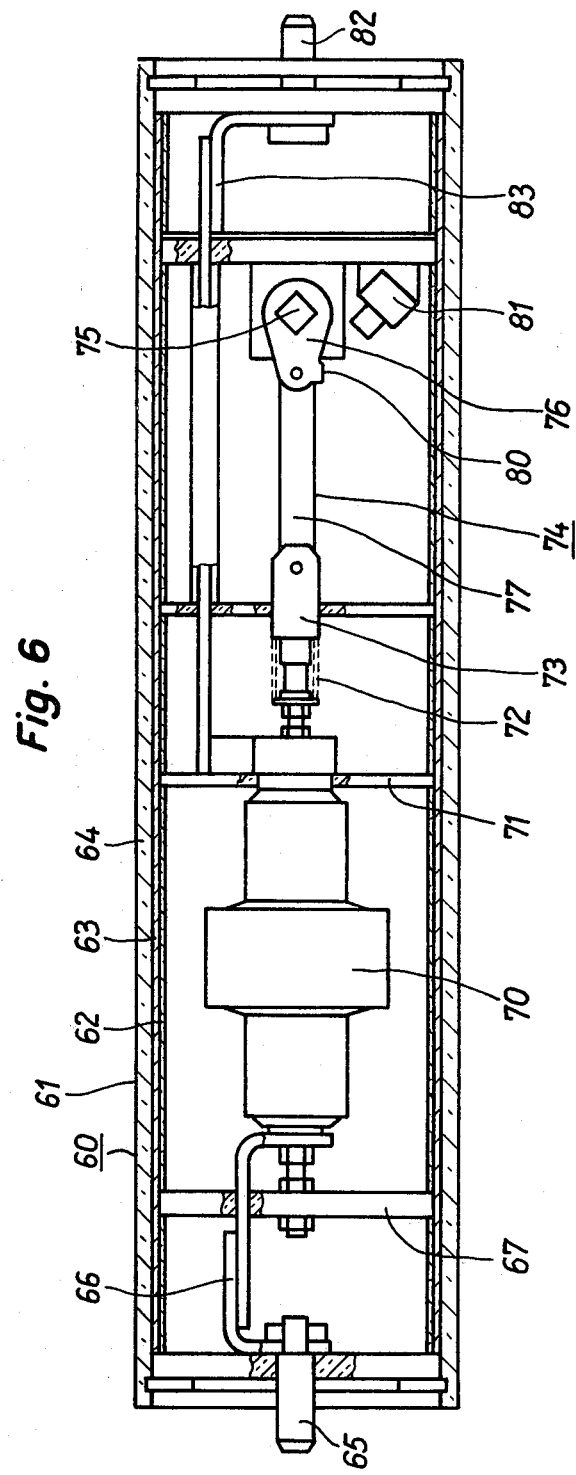

SWITCHING APPARATUS FOR MEDIUM-VOLTAGE CABLE NETWORKS

BACKGROUND OF THE INVENTION

1. Field of the Invention

The invention relates to a switching apparatus which can be used for medium-voltage cable networks, can be embedded in the soil and includes switching units.

2. Description of the Prior Art

Apparatus of the aforesaid type is disclosed, for example, in the German Offenlegungsschriften Nos. 24 21 760 and 25 00 156 and in U.S. Pat. No. 2,785,319. More particularly, such apparatus includes a plurality of switching units which comprise insulation-encapsulated load circuit breakers. These switching units are disposed in an underground room to which cables are brought and are operated from the ground surface by means of a switching rod which is introduced into the underground room.

Apparatus of the above type has the advantage over the more conventional above the ground installations of requiring substantially less volume and, therefore, of being less expensive to construct. For applications in urban areas, the absence of any structures above the ground is also an advantage.

It is an object of the present invention to provide an apparatus of the above type which is of minimum complexity, but which possesses the attributes of a modern switching system, such as, for example, remote control, current measurement, switch position indication or similar functions, to thereby realize an apparatus having a high degree of functional clarity and operating safety.

SUMMARY OF THE INVENTION

In accordance with the principles of the present invention, the above and other objectives are realized in a switching apparatus of the above type wherein the switching units are each of a single-pole type and are each comprised of an encapsulation which is adapted to be embedded directly in the soil and of an actuating means which can be remotely controlled.

With the switching apparatus so configured, a separate room for housing the apparatus is obviated. Also, the installation of the cables in a cable network employing the apparatus is facilitated as no elbows for leading them into a cable cellar or an underground room housing the apparatus need to be installed.

The actuating means for actuating each switching unit can be of mechanical as well as of electromechanical design and, thus, can be easily remotely controlled. In particular, mechanical actuating mechanisms such as cranks, cams, pneumatic or hydraulic drives which can be operated by a pull rod or a shaft or a pipeline, respectively, can be employed. Likewise, typical electromechanical actuating devices which can be employed are magnetic or motor drives. With the latter type devices, only an electric control line needs to be run in the soil and no further measures need to be taken to protect the line.

Connection of cables to the switching units of the apparatus of the invention can be carried out, for example, through the use of joint boxes. It is further advantageous, however, to form each unit to have a substantially cylindrical shape and to include at at least one end face of the unit a connecting device having the form of a cable plug device. Devices of the latter type are disclosed in U.S. Pat. No. 3,471,669 and permit connecting the cables to the switching units in a manner which requires little labor. It is also advisable to provide each switching unit at one end face with a connecting device for two cables so that the switching unit can also be readily used for ring cable stations.

In one embodiment of the present switching apparatus, each of the switching units thereof is constructed of a corrosion-protected pipe which forms the encapsulation. Inserted in the pipe and arranged coaxially are a switching element, a drive element, and measuring and monitoring elements. These elements, in turn, are connected together by unified coupling devices arranged between respective adjacently disposed elements. The coupling devices employed can be used to establish electrical and/or mechanical connections between the elements. In this manner, the switching units can be readily adapted to the requirements of each particular situation.

More particularly, while it may suffice for the switching units of the switching apparatus to contain at one point in a cable network only one switching element and a mechanically operable actuating element, it may be desirable at another point of the cable network for the switching units to additionally include current transformers and switch position indicators. The present design of the switching units wherein individual elements are connected together by coupling devices, thus, permits assembly of the switching units required in each case from the same production units without the necessity of any additional redesigning.

Since a medium-voltage network is at a voltage level immediately above the low voltage needed by consumers, it typically is used to feed distribution transformers whose output, in turn, is fed to the consumers. The switching apparatus of the present invention can, thus, be adapted for use in a medium-voltage transformer station by mounting each of the switching units thereof to a transformer. The transformer and the switching units mounted thereon hence together form an assembly which can be jointly embedded in the soil.

The switching apparatus of the present invention can be further configured such that opposite ends of each of its switching units is equipped with a connecting device. In such case, each switching unit can be arranged in line with a single-conductor cable. With switching units of this type, cable switching stations can be erected without the need for a structural body and the associated control room can be formed by a simple and inexpensive, prefabricated unit.

BRIEF DESCRIPTION OF THE DRAWINGS

The above and other features and aspects of the present invention will become more apparent upon reading the following detailed description in conjunction with the accompanying drawings in which:

FIG. 4 shows schematically, in cross section, a load switching unit which can be employed for the load switching units of the apparatus of FIGS. 1 to 3;

FIG. 6 shows a further embodiment of a switching unit useable in the apparatus of FIGS. 1 to 3.

DETAILED DESCRIPTION

Figure 1:
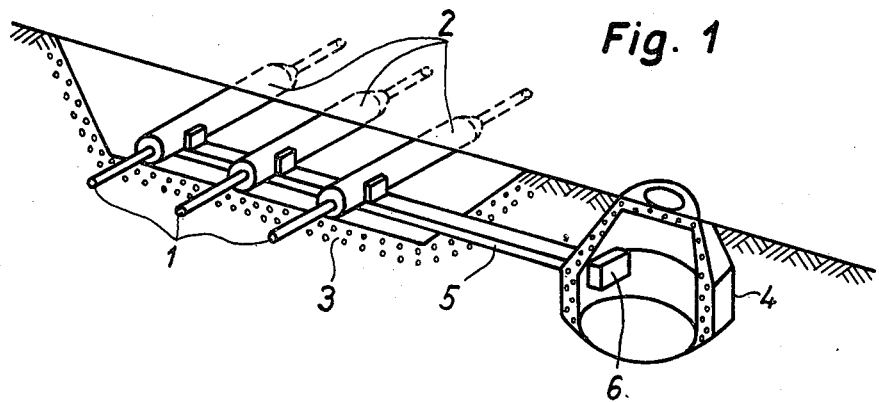
FIG. 1 shows schematically a switching apparatus including three load switching units in accordance with the principles of the present invention.

FIG. 1 shows a cable switching station for use with medium voltage networks which employs a switching apparatus in accordance with the principles of the present invention. The switching station includes three single-conductor cables 1 arranged in parallel. In line with each cable 1 is disposed a circuit breaker or load switching unit 2, the dimensions and outside design of which correspond to those of well-known cable splice boxes. The units 2 are further arranged directly in the soil in spaced parallel relationship and are supported on a lean-concrete bed 3.

Displaced to one side and at a distance from the switching units 2 there is likewise situated in the soil an underground control room 4 which is formed of prefabricated concrete parts such as are used, for example, in the construction of manhole entrances of underground ducts. A control duct 5 extends between the control room 4 and the load switching units 2 and includes therein mechanical, electrical or other means for actuating the load switching units. Thus, for example, in the control duct 5 may be arranged a rotatably supported shaft which actuates via suitable gears, flexible joints or the like the drive devices included in the load switching units 2. This shaft may be accessible at the control box 6 in the control room 4 and may be operable via a handle.

The load switching units 2 may also be operable by separate shafts acting independently of one another. Similarly, the load switching units may be operated by electrical or pneumatic actuation. If electrical actuation is used, the simplest construction of the control duct 5 is obtained, as in such case, only a protective conduit for a cable, or a cable with appropriate armor is required.

As FIG. 1 shows, the construction of the cable switching station shown therein only requires the formation of the lean concrete bed 3, which can be accomplished simply, and the placing of the prefabricated concrete parts forming the control room 4 in a prepared pit. The control duct 5 and the control box 6 are, likewise, prefabricated parts which need only to be connected to the load switching units 2 and the control room 4 via the provision of suitable seals at the joints.

Figure 2:
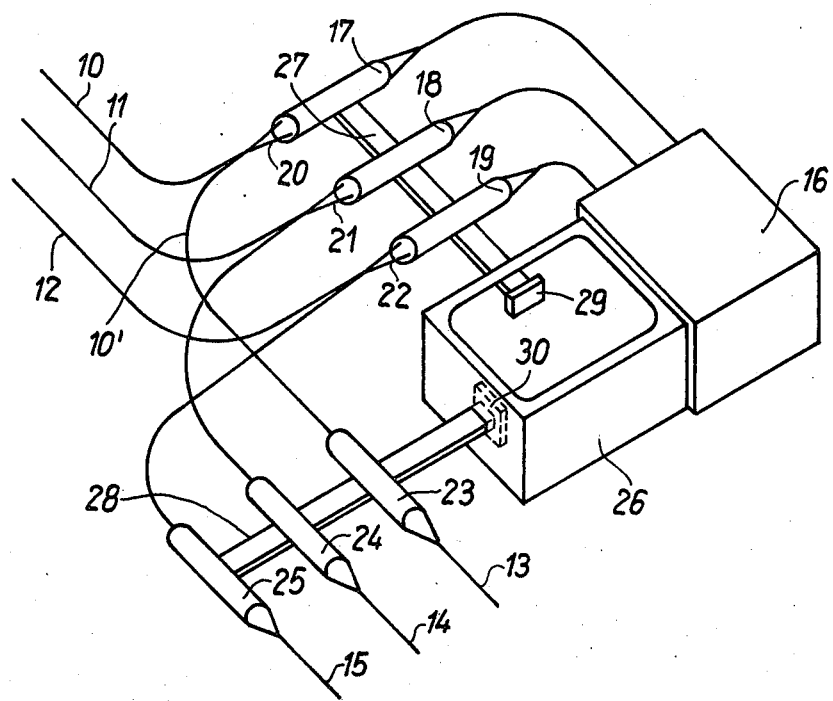
FIG. 2 illustrates a second embodiment of a switching apparatus in accordance with the principles of the present invention.

FIG. 2 shows a further cable switching station employing a switching apparatus in accordance with the invention wherein, in addition to the load switching units and a control room as per the apparatus of FIG. 1, the apparatus additionally includes a transformer which serves to supply a low-voltage to consumers.

More particularly, the station includes parallel arranged sets of single-conductor cables 10, 11 and 12 and 13, 14 and 15 which are part of a ring cable system, to which a transformer 16 is connected. The low-voltage cables extending from the transformer and the low-voltage switches associated therewith are not depicted in the drawing in order to preserve the clarity of the illustration.

The transformer 16 is connected to the ring cable system via load switching units 17, 18 and 19, the ends 20, 21 and 22 of which on the network side being provided with connecting devices for coupling to incoming and outgoing cables. The load switching unit 17, for example, has a connecting device at one end for coupling to the incoming cable 10 and the outgoing cable 10'. At the ends opposite the ends 20, 21 and 22, the units 17, 18 and 19 are provided with further connecting devices for coupling the units to the cables leading to the transformer 16.

To permit the ring cable system to be opened, additional load circuit breakers or switching units 23, 24 and 25 are provided in line with the further cables 13, 14 and 15, respectively.

Both groups of load switching units 17, 18 and 19 and 23, 24 and 25 can be switched on and off from a common control room 26. To this end, control ducts 27 and 28 which are associated with control boxes 29 and 30 mounted in the control room 26 are provided for the respective two groups of load switching units. Preferably, the load switching units include electro-magnetic or electro-motor-operated actuating devices, thereby permitting the auxiliary energy required for their operation to be derived from the secondary side of the transformer 16. In such case, the control boxes 29 and 30 can be equipped in the manner of known control boards with pushbuttons for switching on and off with devices for indicating the switch positions, and with current-measuring devices.

As shown in FIG. 2, the cable branches which lead to the transformer 16 and in which the load switching units 17, 18 and 19 are inserted, run approximately at right angles to the sets of cables 10, 11 and 12 and 13, 14 and 15. Consequently, the control ducts 27 and 28 associated with the aforesaid sets of cables end in the control room 26 approximately at right angles to each other. This permits a clean-cut and interference free arrangement of the control boxes 29 and 30.

The physical relationship of the transformer 16 and the control room 26 is selected so that a common pit can be dug for the two components of the network station. It is further advisable to use the same prefabricated parts for the control room and the transformer room. The transformer, however, may also be designed such that direct embedment in the soil is possible, thereby eliminating the need of a structure for installing the transformer. The immediately adjoining arrangement of the transformer and the control room has the further advantage that the control room can be provided with monitoring devices, such as, for example, temperature monitors and controls for a step switch, for monitoring the transformer.

To improve the clarity of the presentation, the soil surrounding the components in FIG. 2 has not been shown. The upper surface of such soil will typically be approximately flush with the surfaces of the components which constitute the upper closure of the control room 26.

Figure 3:
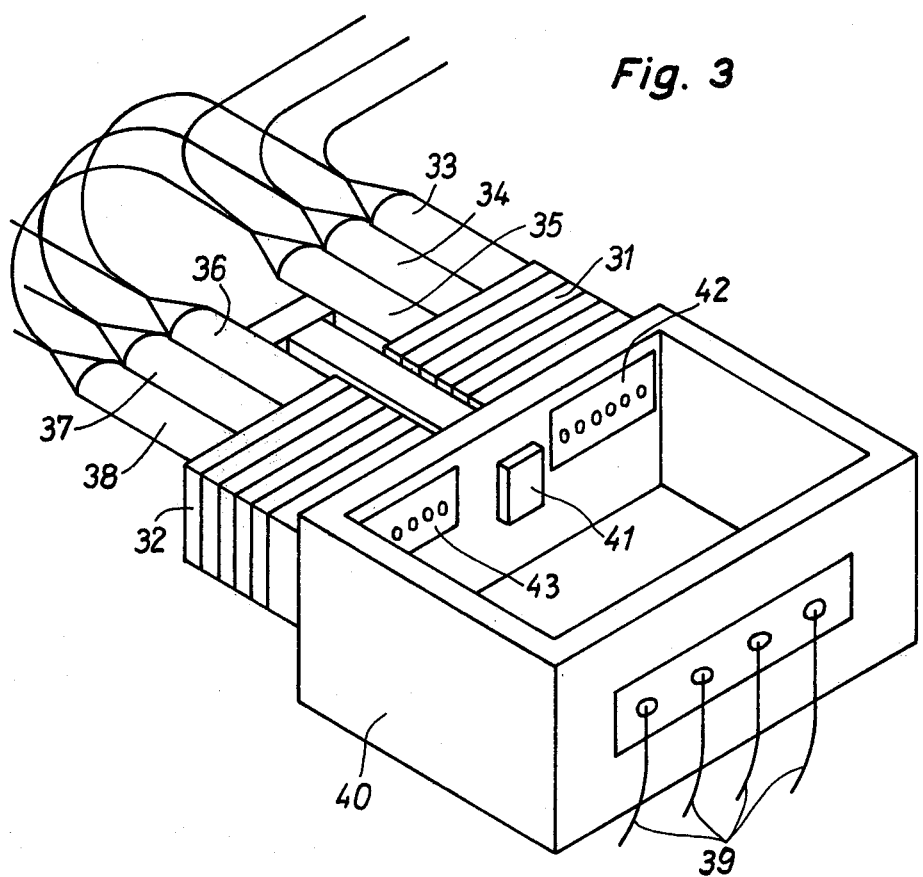
FIG. 3 shows a third embodiment of a switching apparatus in accordance with the principles of the present invention.

FIG. 3 shows a further embodiment of a cable switching station employing a switching apparatus in accordance with the present invention. More particularly, the switching apparatus includes two transformers 31 and 32 having single-pole power load circuit breakers or switching units 33, 34 and 35 and 36, 37 and 38, directly mounted thereto. The two assemblies, each including a transformer and three load switching units, are embedded in the soil and are directly adjacent to a control room 40, which contains a control box 41 for actuating the load switching units. The transformers 31 and 32 are designed so that their low-voltage terminals 42 and 43 are accessible in the control room 40 to provide power for low-voltage switchgear and the distribution devices arranged therein. Several outgoing low-voltage cables 39 are shown on the side of the control room 40 opposite the transformers 31 and 32.

FIG. 4 shows a load switching unit 44 which can be used for the switching units of each of the switching apparatuses of FIGS. 1 to 3. The switching unit 44 includes a protective tube 45 which comprises an inner insulation 46, a grounding jacket 47 and an outer protection jacket 48. Disposed within the tube 45 are several elements which are connected to each other by unified plug-in devices 50. More specifically, situated at the left-hand end of the protective tube 45 is a female portion 51 of a cable plug-in device, the latter portion being provided with a sealing lip 52. Following the portion 51 is a current transformer 53, which can be used for measuring and tripping purposes. Situated adjacent the transformer 53 is an actuating device 54, which may, for example, be of an electromagnetic or pneumatic action type and which imparts driving motion to a switching element 55, which may, preferably, be a vacuum switching vessel. At the right-hand end of the load switching unit following the element 55, a female portion part 57 of a further cable plug-in device is again arranged.

A device for indicating the switch position can be connected to the actuator unit 54. However, an additional indicating element can also be inserted between the actuator unit 54 and the switching element 55.

As can be appreciated from FIG. 4, the load switching unit shown therein can be readily modified to provide a variety of differently equipped switching units. Thus, for example, the transformer 53 may be left out if a current measurement is not required. In such case, a dummy element containing only a connecting conductor can be inserted into the space provided for the current transformer 53. In FIG. 4, a dummy element 56 of this kind is inserted between the transformer element 53 and the actuator element 54. The switching unit of FIG. 4 thus has the advantage that for all configurations of the unit, the same protective tube 45 can be employed. On the other hand, protective tubes of different lengths can also be used for the different configurations of the load switching units.

Figure 5:
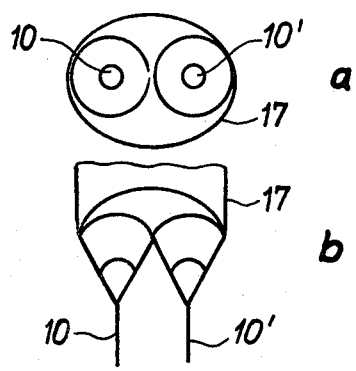
FIG. 5 shows a further load switching unit which can be employed for the switching units of the apparatus of FIGS. 1 to 3 and wherein the unit is configured for connection to two cables.

In cable switching stations employing a ring cable network as above-described, it is generally necessary to connect two cables to the switching unit, unless additional clamping devices or the like are to be used. In order to facilitate connecting two cables to a load switching unit, the unit can be designed as shown in FIG. 5. The latter figure shows the load switching unit 17 of FIG. 2. In particular, FIG. 5a shows a view of the end face of the unit and FIG. 5b a top view of the end of the unit. As illustrated by these figures, the connecting device located at the end face of the load switching unit 17 has two receiving openings for the cables 10 and 10'. Both of these openings can be designed in the manner of known cable plug-in devices.

FIG. 6 shows further load switching unit 60 which can be used for the switching units of FIGS. 1 to 3. This load switching unit also comprises a protective tube 61 which has an inner insulating layer 62, a grounding jacket 63 and a protective outer jacket 64. The interior of the protective tube 64 is divided by partitions into several compartments, in which are arranged the different components of the load switching unit.

Situated at the left-hand end face of the protective tube 64 is a contact pin 65, which may be part of a cable plug-in device, not shown. The contact pin 65 is connected via a connecting conductor 66 to a vacuum switching vessel 70, the latter vessel being fastened at one end in the partition 67 and being fastened at its other end in a further partition 71. The space adjoining the vacuum switching vessel 70 contains a coupler 73 which is provided with a contact pressure spring 72 and is connected to a mechanical actuating device 74 in the adjoining space. The actuating device 74 comprises a driving shaft 75 with a crank arm 76 and a push rod 77. The crank arm 76 is provided with a stop surface 80, which cooperates with an indicator switch 81. The termination of the load switching unit 60 at the right-hand end face of the tube 64 is formed by a further contact pin 82, which is connected to the vacuum switching vessel 70 via a conductor 83. The latter is brought in an insulated manner through the space containing the actuating device 74.

The drive shaft 75 is coupled in a sealed manner through the protective tube 64 and can be driven by an external shaft.

The switching unit of FIG. 6 can also be easily modified to remove or install further components. Thus, a current transformer may be included in the unit by mounting same in the area of the connecting conductor 66. Moreover, a magnetic drive or a motor drive can be installed in place of the mechanical drive 74.

As can be appreciated from the above, the load switching units of the apparatus of the invention permit the building of switching and transformer stations for medium-voltage cable networks at particularly low construction costs. In general, it is only necessary to dig a pit for the load switching units, to connect the units to the network cable ends, and to provide a connection via a control duct with a control room consisting of prefabricated parts. The entire arrangement can, subsequently, be covered over with soil, so that there are no parts projecting over the street or terrain level.

The switching units can, in addition, also be designed as power circuit breakers. Vacuum pressure vessels or single-pressure $SF_6$ breakers are particularly well suited for this purpose.

What is claimed is:

1. A single-pole switching unit adapted to be imbedded in the soil and to be used for medium voltage cable networks, said unit comprising:
   a protective housing having opposed ends and adapted to be imbedded in the soil;
   a switching element axially disposed in said protective housing;
   actuating means for actuating said switching element, said actuating means being controlled remotely of said unit;
   cable plug-in means disposed adjacent to said ends of said housing coaxially with said switching element for connecting cables of a cable network substantially coaxially with said cable plug-in means; and
   coupling means disposed in said housing coaxially with said switching element and said cable plug-in means for connecting said switching element and said cable plug-in means.

2. A switching unit in accordance with claim 1 in which said cable plug-in means comprises a plug-in member disposed at each end of said protective housing, each plug-in member being adapted to receive a cable substantially coaxially therewith.

3. A switching unit in accordance with claim 1 in which said cable plug-in means comprises a cable plug-in member disposed at each end of said housing, each cable plug-in member being adapted to receive two cables substantially coaxially therewith.

4. A switching unit in accordance with claim 1 in which said protective housing is a tubular encapsulation.

5. A switching unit in accordance with claim 1 and comprising at least one of a measuring element, an indicating element and a transformer disposed within said housing coaxially with said switching element and said cable plug-in means.

* * * * *